United States Patent
Lewis et al.

(10) Patent No.: US 9,273,945 B2
(45) Date of Patent: Mar. 1, 2016

(54) INSPECTION DEVICE FOR MEASURING PIPE SIZE

(75) Inventors: Jeff Lewis, Kingsville (CA); Darcy Warren, Essex (CA); Ron Bartel, Wheatley (CA); Steve Bartel, Ruthven (CA)

(73) Assignee: Liqui-Force Sewer Services Inc., Kingsville, Ontario (CA)

(*) Notice: Subject to any disclaimer, the term of this patent is extended or adjusted under 35 U.S.C. 154(b) by 412 days.

(21) Appl. No.: 13/576,239

(22) PCT Filed: Jul. 28, 2011

(86) PCT No.: PCT/CA2011/000859
§ 371 (c)(1),
(2), (4) Date: Jul. 31, 2012

(87) PCT Pub. No.: WO2012/016324
PCT Pub. Date: Feb. 9, 2012

(65) Prior Publication Data
US 2012/0300224 A1    Nov. 29, 2012

Related U.S. Application Data

(60) Provisional application No. 61/370,837, filed on Aug. 5, 2010, provisional application No. 61/497,199, filed on Jun. 15, 2011.

(51) Int. Cl.
*G01B 1/00* (2006.01)
*G01B 3/00* (2006.01)
(Continued)

(52) U.S. Cl.
CPC .. *G01B 5/00* (2013.01); *G01B 5/12* (2013.01); *G03B 37/005* (2013.01); *E21B 47/08* (2013.01); *G01B 3/28* (2013.01); *G01B 7/13* (2013.01); *G01B 7/281* (2013.01)

(58) Field of Classification Search
CPC .............. G01B 3/28; G01B 5/12; G01B 7/13; G01B 7/281; E21B 47/08
USPC .................................... 33/542, 544
See application file for complete search history.

(56) References Cited

U.S. PATENT DOCUMENTS 2,102,080 A * 12/1937 Kinley .................... E21B 47/08
    175/277
2,656,613 A * 10/1953 Goble .......................... 33/544.2
(Continued)

FOREIGN PATENT DOCUMENTS

| CA | 2520332 | 7/2008 |
| CA | 2706036 | 12/2010 |
| EP | 2194624 A1 * | 6/2010 |

OTHER PUBLICATIONS

International Search Report & Written Opinion for PCT Application No. PCT/CA2011/000859 mailed Oct. 4, 2011.

*Primary Examiner* — Laura Martin
*Assistant Examiner* — Rhyan C Lange
(74) *Attorney, Agent, or Firm* — Carlson, Gaskey & Olds, P.C.

(57) ABSTRACT

A disclosed measurement head includes a sensor body attached to a camera by a resilient member. The sensor body includes a sensor that measures linear distance and is actuated by arms pivoting outward from the sensor body into contact with an interior surface of pipe for measurement. Each of the arms includes a catch engageable to a latch sleeve to hold each of the arms in a compact folded position for insertion into a pipe. The latch sleeve is movable to release the catch and the arms to provide for measurement of the interior profile of the pipe. Another measurement head includes guide wires attached to an end of each of the arms. The guide wires provide for movement of the arms to provide for insertion of the measurement head into and through a pipe.

13 Claims, 5 Drawing Sheets

(51) Int. Cl.
    *G01B 5/00*     (2006.01)
    *G01B 5/12*     (2006.01)
    *G03B 37/00*     (2006.01)
    *E21B 47/08*     (2012.01)
    *G01B 7/28*     (2006.01)
    *G01B 7/13*     (2006.01)
    *G01B 3/28*     (2006.01)

(56) References Cited

U.S. PATENT DOCUMENTS

| | | | | |
|---|---|---|---|---|
| 2,680,913 A * | 6/1954 | Johnston et al. | | 33/544.2 |
| 2,815,578 A * | 12/1957 | Broussard | | 33/544.3 |
| 2,829,441 A * | 4/1958 | Bagnell | | 33/544.3 |
| 4,085,510 A * | 4/1978 | Kirschke | | G01B 11/12 33/544.3 |
| 4,181,290 A * | 1/1980 | Affolter | | 254/124 |
| 4,530,161 A * | 7/1985 | Blankinship | | G01B 7/13 33/544.2 |
| 5,917,774 A * | 6/1999 | Walkow et al. | | 367/25 |
| 7,409,774 B2 * | 8/2008 | Luling | | 33/544.2 |
| 2004/0160600 A1* | 8/2004 | Drost et al. | | 356/241.1 |
| 2005/0211429 A1* | 9/2005 | Gray et al. | | 166/55 |
| 2006/0064889 A1* | 3/2006 | Fredette | | G01B 7/13 33/544 |
| 2009/0194284 A1* | 8/2009 | Jahn | | 166/298 |
| 2010/0319991 A1* | 12/2010 | Brannigan et al. | | 175/40 |
| 2011/0227010 A1* | 9/2011 | Rubin | | H02G 1/08 254/134.3 FT |

* cited by examiner

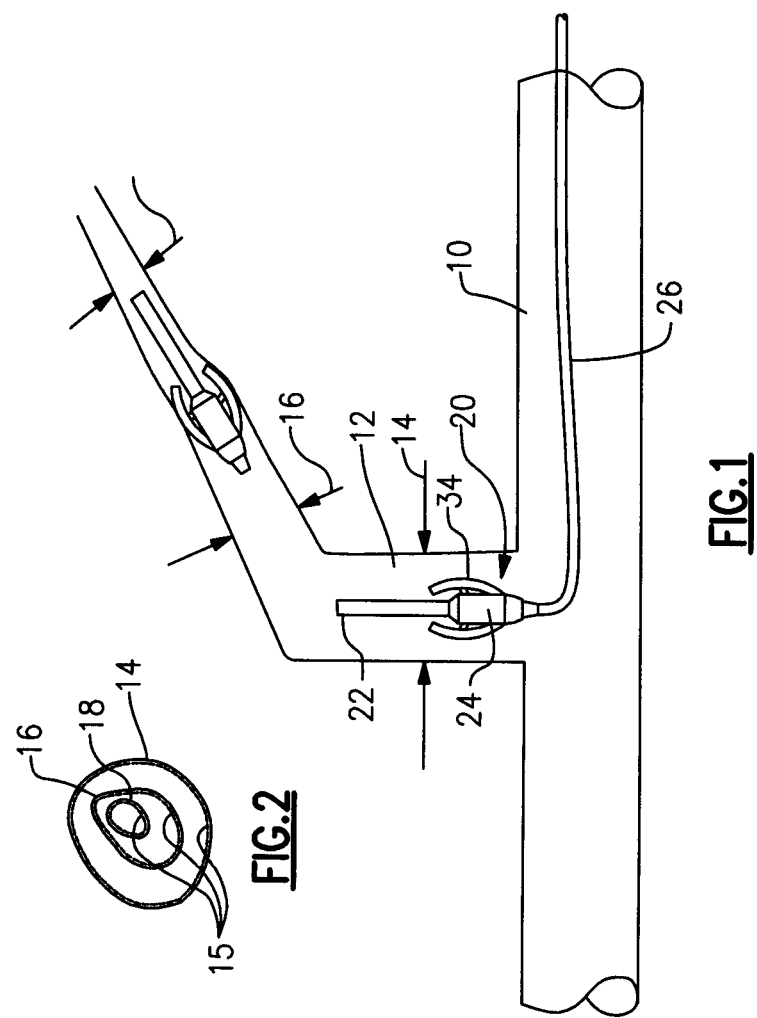

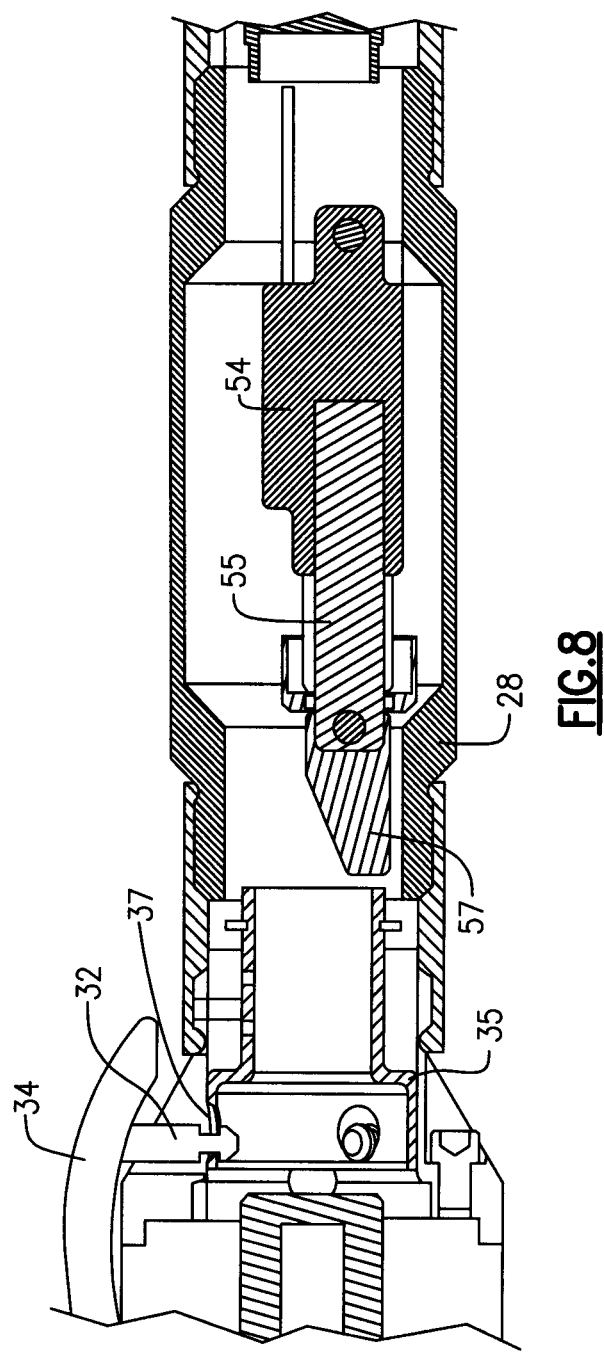

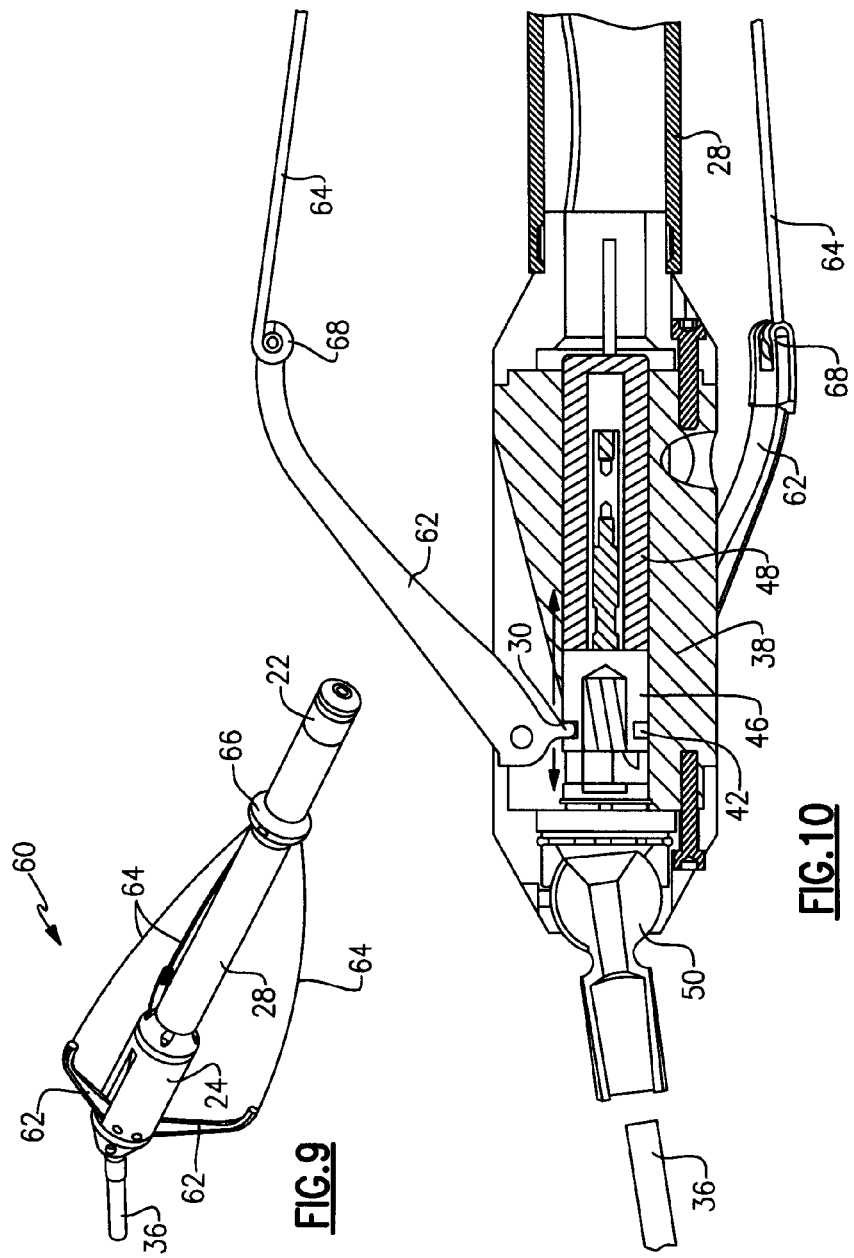

INSPECTION DEVICE FOR MEASURING PIPE SIZE

CROSS REFERENCE TO RELATED APPLICATION

This application claims priority to U.S. Provisional Application Nos. 61/370,837 filed Aug. 5, 2010 and 61/497,199 filed on Jun. 15, 2011.

BACKGROUND

This disclosure generally relates to a device and method of measuring a sewer pipe.

A cured in place pipe lining method utilizes a resin soaked liner that is installed within a sewer. The resin soaked liner is forced against the inner walls of a sewer with fluid or mechanical pressure until cured. Once cured the liner becomes a new pipe within the original pipe. The resin soaked liner is custom tailored to the particular sewer pipe to match diameter and length requirements. Accordingly, prior to installation, the old sewer pipe is cleaned and measured. Measurements such as the pipe diameter are required for the entire desired length of lining. Further, in many instances a video inspection of the sewer is desired to contrast the original and repaired state of the sewer pipe.

SUMMARY

A disclosed measurement head includes a sensor body attached to a camera by a resilient member. The sensor body includes a sensor that measures linear distance and is actuated by arms pivoting outward from the sensor body into contact with an interior surface of pipe for measurement. Each of the arms includes a catch engageable to a latch sleeve to hold each of the arms in a compact folded position for insertion into a pipe. The latch sleeve is movable to release the catch and the arms to provide for measurement of the interior profile of the pipe.

Another measurement head includes guide wires attached to an end of each of the arms. The guide wires provide for movement of the arms to provide for insertion of the measurement head into and through a pipe.

These and other features disclosed herein can be best understood from the following specification and drawings, the following of which is a brief description.

BRIEF DESCRIPTION OF THE DRAWINGS

FIG. 1 is a schematic view of an example sewer system and inspection device.
FIG. 2 is a sectional view of a portion of a sewer system.
FIG. 8 is a sectional view of a latch sleeve and catch in a retracted position.
FIG. 9 is a perspective view of another example measurement head.
FIG. 10 is a sectional view of the example measurement head of FIG. 8.

DETAILED DESCRIPTION

Figure 3:
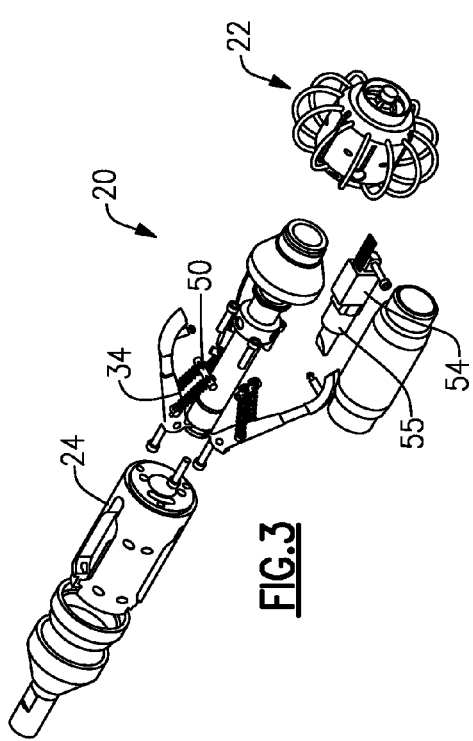
FIG. 3 is an exploded view of an example measurement head.
Figure 4:
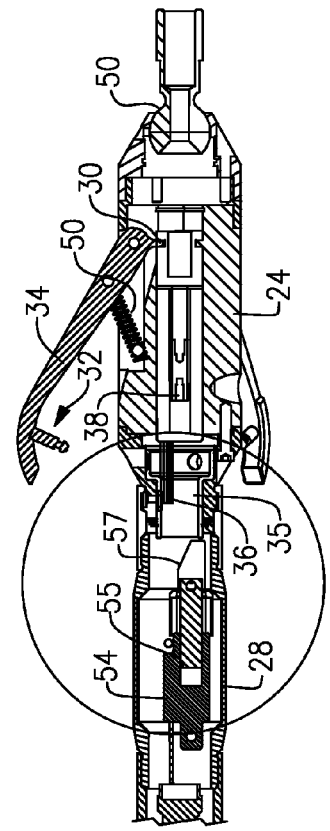
FIG. 4 is a side sectional view of an example inspection device.
Figure 6:
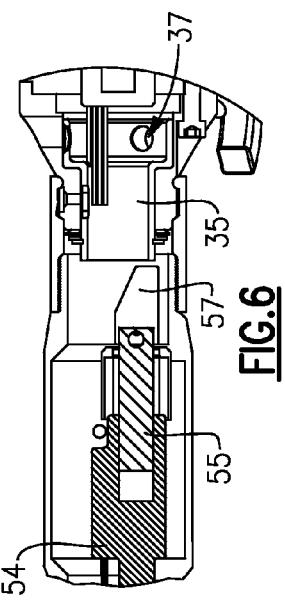
FIG. 6 is a partial sectional view of a portion of the example inspection device.

Referring to FIGS. 1 and 2, an example sewer system is schematically shown and includes several service lateral sewer pipes 12 (only one shown) that lead into one common main sewer pipe 10. The example lateral sewer pipe 12 includes a first diameter 14. As should be appreciated, laterals 12 may have a varying diameter 15 and therefore measurements to confirm the lateral diameter are required. In the example schematically shown, the lateral 12 includes the first diameter 14, a second diameter 16 and a third diameter 18. The size of the lateral 12 is required to provide a desired repair liner.

A disclosed measurement head 20 is shown that is inserted into the lateral 12 for measuring an inner diameter along the length of the lateral 12. The measurement head 20 includes a camera 22 connected to a sensor body 24. The example measurement head 20 is moved into the lateral 12 by pushing and/or pulling on the cable 26. The example cable 26 includes the required connections to transmit images and data back to a location remote from the measurement head. Moreover, the example measurement head 20 is shown and described in reference to measurement of a lateral sewer pipe, however, measurements are not limited to lateral sewer pipes and any pipe or conduit could be measured utilizing the disclosed measurement head 20.

Referring to FIGS. 3-6, the example measurement head 20 includes the sensor body 24 that is attached to the camera 22 by a resilient member 28. The example resilient member 28 comprises a spring that is attached on one end to the sensor body 24 and on the other end to the camera 22. The resilient member 28 allows relative movement of the camera 22 and the sensor body 24 to provide for movement around bends that may be present in the lateral 12.

The camera 22 includes a light for illuminating that portion of the lateral 22 that is being viewed. A cable 36 for the camera 22 extends through the resilient member 28 between the sensor body 24 and the camera 22.

The sensor body 24 includes a sensor 38 that measures linear distance and is actuated by fingers 30. Each of the fingers 30 are pivotally attached to the sensor body 24 on one end. The fingers 30 are part of an arm 34 that pivots relative to the sensor body 24. Each of the arms 34 includes a catch 32. The catch 32 is engageable to a latch sleeve 35. The latch sleeve 35 includes openings that receive the catch 32 to hold each of the arms 34 in a compact folded position.

Figure 5:
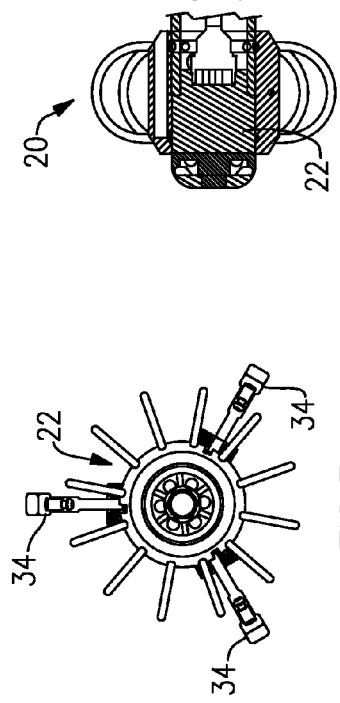
FIG. 5 is a front view of the example inspection device.

In this example, there are three arms 34 located symmetrically about the sensor body 24 (FIG. 5). Each of the arms 34 extends radially outward from the sensor body 24 to contact an interior surface of the lateral 12 when released from the latch sleeve 35. Although the example measurement head 20 includes three extending arms 34, more or less arms are within the contemplation of this disclosure.

Movement through the lateral 12 is difficult due to obstructions, inconsistent diameters, and pipe sizes. The example measurement head 20 latches the arms 34 in a compact or retracted position to allow movement of the head 20 into the lateral 12. Once the head 20 reaches a desired length into the lateral 12, the arms 34 are released and extend to contact the inner surface. The amount that the arms 34 extend is input through the fingers 30 to the sensor 38. The pivoting motion of the arms 34 is translated into linear movement by the fingers 30 that move the sensor 38. In this example, the sensor 38 detects linear movement that corresponds to outward radial movement of the arms 34 and thereby a diameter of the lateral 12.

Figure 7:
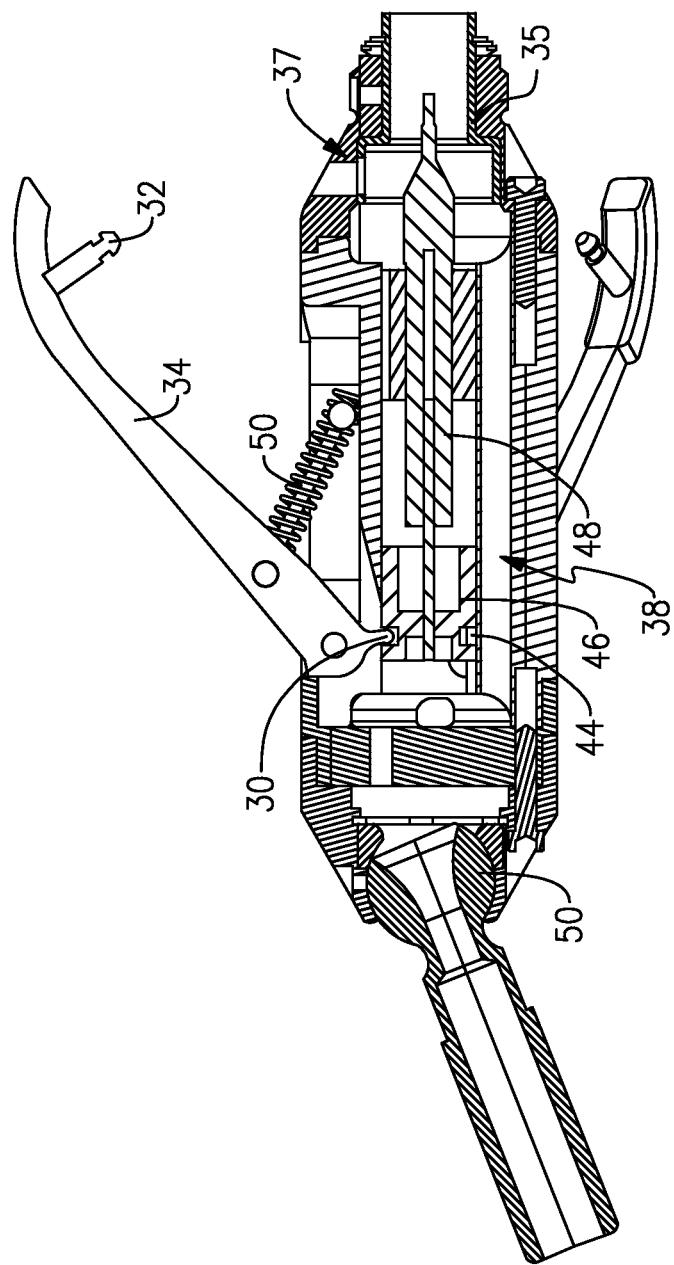
FIG. 7 is a sectional view of the example inspection device.

Referring to FIGS. 7 and 8, movement of the fingers 30 is sensed as linear movement by the sensor 38. In this example, the sensor 38 is a linear variable displacement transducer (LVDT) that provides information indicative of linear movement of an armature 46. Each of the fingers 30 are received within a slot 44 of an armature 46 such that radial movement of each arm 34 is converted into linear movement of the armature 46.

The armature 46 moves within a coil 48 and causes a variation in inductance. The change in inductance is correlated with linear movement of the armature 46 that in turn corresponds with a radial extension of the arms 34. The conversion of the radial movement to linear movement of the armature 46 is proportioned such that the larger radial movements required by the arms 34 are converted to relatively small linear movements of the armature 46. Accordingly, the sensor 38 is not required to include a stroke that matches that of the radial movement of the arms 34. Instead, the example sensor 38 is moved a proportioned amount that is indicative of the relative movement of the arms 34 and thereby the diameter of the pipe.

A spring 50 biases each of the arms 34 radially outward such that when released from the catch 32, the arms 34 are released from the latch sleeve 35. FIG. 8 shows the arms 34 in a retracted position with the catch 32 caught within an opening 37 of the latch sleeve 35. Each of the openings 37 is larger than the catch 32 and engages a groove provided on each catch 32. The latch sleeve 35 is movable by an actuator 54. The example actuator 54 includes a push rod 55 that drives a latch pusher 57 against the latch sleeve 35. Pushing on the latch sleeve 35 moves the latch sleeve 35 such that the catch 32 no longer engages an edge of the openings 37 and therefore releases. The springs 50 are then free to bias the arms 34 radially outward against the inner surface of the pipe 12.

In operation, the measurement head 20 is pushed through a main 10 to a lateral 12. The arms 34 are placed in the retracted position with each catch 32 engaged to the latch sleeve 35. As appreciated, although the disclosed example measurement head 20 is described as measuring a lateral 12, other sewer pipes, or interior diameters of pipe could also be measured. Moreover, movement of the disclosed measurement head 20 can be accomplished utilizing known motors and drives.

The camera 22 includes a light that illuminates the interior of the lateral 12 and transmits images by way of the cable 26 to a remote location out of the sewer. Once the measurement head 20 has been driven a desired distance into the lateral 12 diameters measurements can begin. Movement through the lateral 12 and around corners and bends is facilitated by the configuration of the measurement head 20. Because the arms 34 are in a retracted position, the measurement head 20 is able to maneuver easily through the pipes.

Once the measurement head 20 is pushed into the sewer to a desired point, the actuator 54 is activated to push the latch sleeve 35 forward. Movement of the latch sleeve 35 forward releases the catch 32. The biasing springs 50 then drive the arms 34 radially outward into contact with the inner surface of the pipe, or lateral 12 in this example.

Measurement of the inner diameter of the lateral 12 is determined by the radial extension of the arms 34 as communicated to the sensor 38 by the fingers 30. The radial extension of the arms 34 causes a corresponding movement of the sensor 38. The sensed linear movement by the sensor 38 is correlated to the radial distance that the arms 34 extended from the sensor body 24 to provide data indicative of the inner diameter of the lateral. 12.

Measurements are obtained as the measurement head 20 is pulled back out of the lateral 12. The measurements of diameter can vary along the entire length of the lateral 12 such that a clear picture of the entire inner diameter can be obtained. The measurement of the diameter is correlated to the corresponding position within the lateral 12. The position of the measured diameter can be set by a distance from the opening to the main, or can be set by a position from a point within the lateral 12, such as a property other reference point. The information can be saved digitally for recording and subsequent retrieval. Optionally, the measurement head 20 can be incrementally moved to obtain measurements of lateral inner diameter at predefined interval.

Referring to FIGS. 9 and 10 another example measurement head 60 includes the sensor body 24 that is attached to the camera 22 by a resilient member 28. The example resilient member 28 comprises a spring that is attached on one end to the sensor body 24 and on the other end to the camera 22. The resilient member 28 allows relative movement of the camera 22 and the sensor body 24 to provide for movement around bends that may be present in the lateral 12.

The camera 22 includes a light for illuminating that portion of the lateral 22 that is being viewed. A cable 36 for the camera 22 extends through the resilient member 28 between the sensor body 24 and the camera 22. The sensor body 24 includes a sensor 38 that measures linear distance and actuated by fingers 30 disposed on arms 62. Each of the arms 62 are pivotally attached to the sensor body 24 on one end. A guide wire 64 is attached to a second end of each arm 62. The guide wire 64 extends from the second end 68 of the arm 62 to a collar 66. The collar 66 is attached to an outer surface of the resilient member 28. The pivotal attachment between the guide wire 64 and the arm 62 provides for pivoting movement of the arm 64. In this example, there are three fingers 30 located symmetrically about the sensor body 24.

Referring to FIG. 10, like the preceding example measurement head 20, movement of the arms 62 is communicated by fingers 30 through linear movement by the sensor 38. Each of the fingers 30 includes a tab 42 that is received within a slot 44 of the armature 46 such that radial movement of each finger is converted into linear movement of the armature 46. The armature 46 moves within a coil 48 and causes a variation in inductance.

The arms 62 attached to the guide wires 64 by an attachment loop 68. The guide wires 64 support movement of the measurement head 60 into the pipe by preventing the arms 62 from abutting edges or other obstructions within the pipe. As the measurement head is inserted into the pipe, the guide wires 64 will deflect and move the corresponding arm 62 to prevent binding or catching. Once at the desired location, the measurement head 60 is pulled back out of the sewer pipe and provide measurements as described above.

Although an example embodiment has been disclosed, a worker of ordinary skill in this art would recognize that certain modifications would come within the scope of this disclosure. For that reason, the following claims should be studied to determine the scope and content of this invention.

What is claimed is:
1. A measurement head comprising:
a sensor supported within a sensor body;
a plurality of arms pivotally mounted to the sensor body and movable outwardly from the sensor body to contact an interior surface of the pipe, wherein each of the arms includes a finger engaged to the sensor for communicating an extended distance of the arms indicative of a profile of the interior surface of the pipe to the sensor, the finger extending radially inward and transverse from the corresponding arm into engagement with the sensor; and a guide including a first end and a second end, the first end pivotally attached to a terminal end of a corresponding one of the plurality of arms and the second end pivotally attached to a collar supported on the sensor body forward of the plurality of arms, wherein the guide causes pivoting of a corresponding one of the plurality of arms for guiding past obstructions.

2. The measurement head as recited in claim 1, wherein each of the plurality of arms includes a catch and the body supports a latch sleeve receiving the catch of each of the plurality of arms for holding the arms in a retracted position.

3. The measurement head as recited in claim 2, wherein the latch sleeve is movable to release the catch and allow each of the arms to move radially outward to contact an interior surface of a pipe.

4. The measurement head as recited in claim 3, including an actuator for moving the latch sleeve to a position releasing the catch.

5. The measurement head as recited in claim 1, wherein the sensor measures linear movement of a linearly movable member and the fingers translate radial movement of the arms into linear movement of the sensor.

6. The measurement head as recited in claim 5, wherein the sensor comprises a linear variable displacement transducer.

7. The measurement head as recited in claim 1, including a camera housing including a camera for obtaining and transmitting images and a light for illuminating an interior surface of a pipe.

8. The measurement head as recited in claim 7, including a resilient member attached at one end to the camera housing and at a second end to the sensor body, the resilient member providing for relative movement between the camera and the sensor body.

9. A measurement head comprising:
a sensor supported within a sensor body;
a plurality of arms pivotally mounted to the sensor body and movable outwardly from the sensor body to contact an interior surface of the pipe, wherein each of the arms includes a finger engaged to the sensor for communicating an extended distance of the arms indicative of a profile of the interior surface of the pipe, wherein each of the plurality of arms includes a catch;
a latch sleeve receiving the catch of each of the plurality of arms for holding the arms in a retracted position;
a camera housing supported by a spring attached at one end to the camera housing and at a second end to the sensor body, the spring enabling relative movement between the camera and the sensor body; and
a camera and light supported within the camera housing for obtaining and transmitting images of an interior surface of a pipe.

10. The measurement head as recited in claim 9, wherein the latch sleeve is movable to release the catch and allow each of the arms to move radially outward to contact an interior surface of a pipe.

11. The measurement head as recited in claim 10, including an actuator for moving the latch sleeve to a position releasing the catch.

12. The measurement head as recited in claim 11, wherein the actuator comprise a solenoid movable linearly to move the latch sleeve from a catch position to a release position releasing the catch.

13. The measurement head as recited in claim 9, wherein the sensor measures linear movement of a linearly movable member and the fingers translate radial movement of the arms into linear movement of the sensor.

* * * * *